Figure 1:
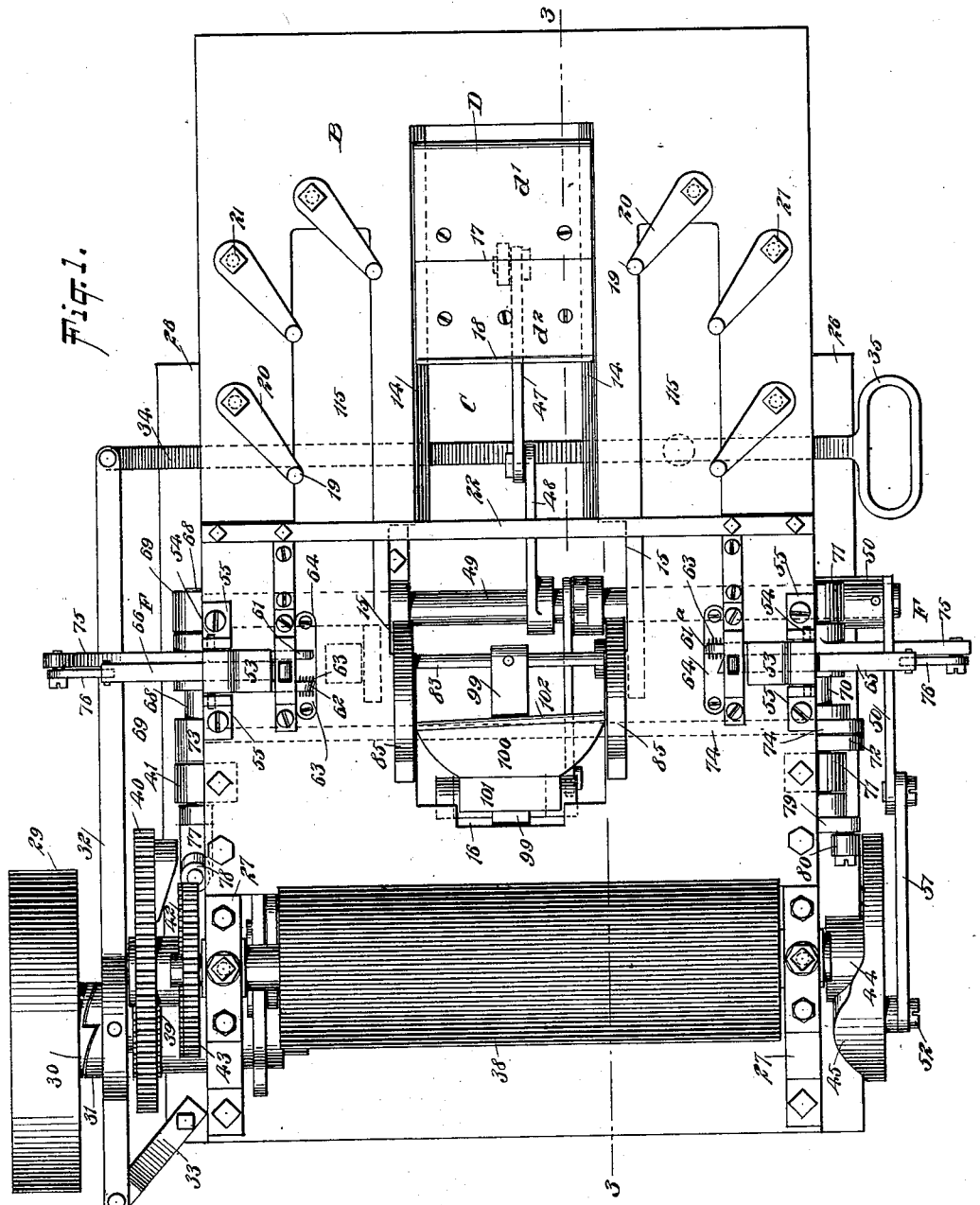

No. 648,241. Patented Apr. 24, 1900.
J. T. CRAW.
PAPER BOX MACHINE.
(Application filed Dec. 16, 1899.)

(No Model.) 7 Sheets—Sheet 1.

WITNESSES:
William P. Goebel.

INVENTOR
Joseph T. Craw
BY
ATTORNEYS

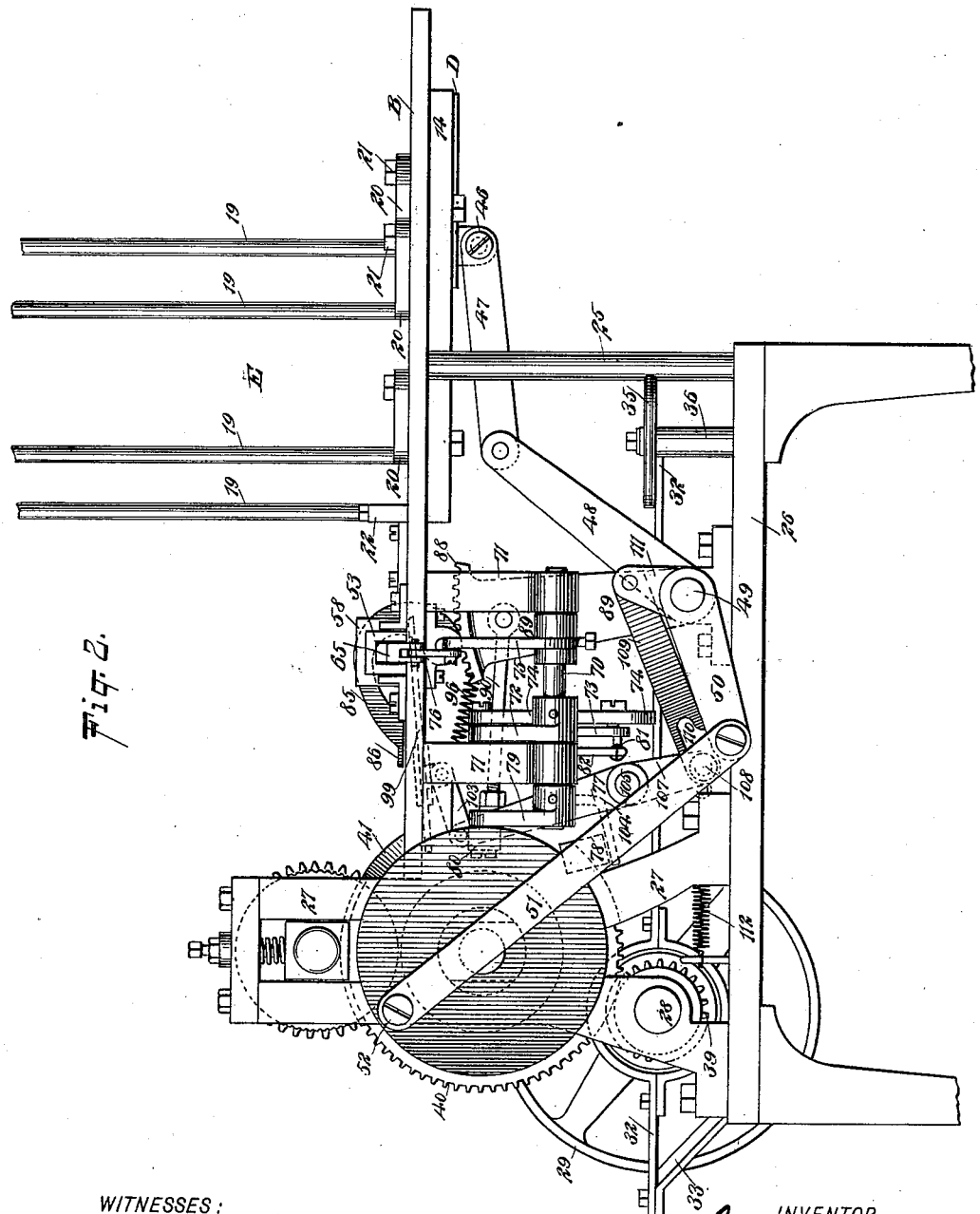

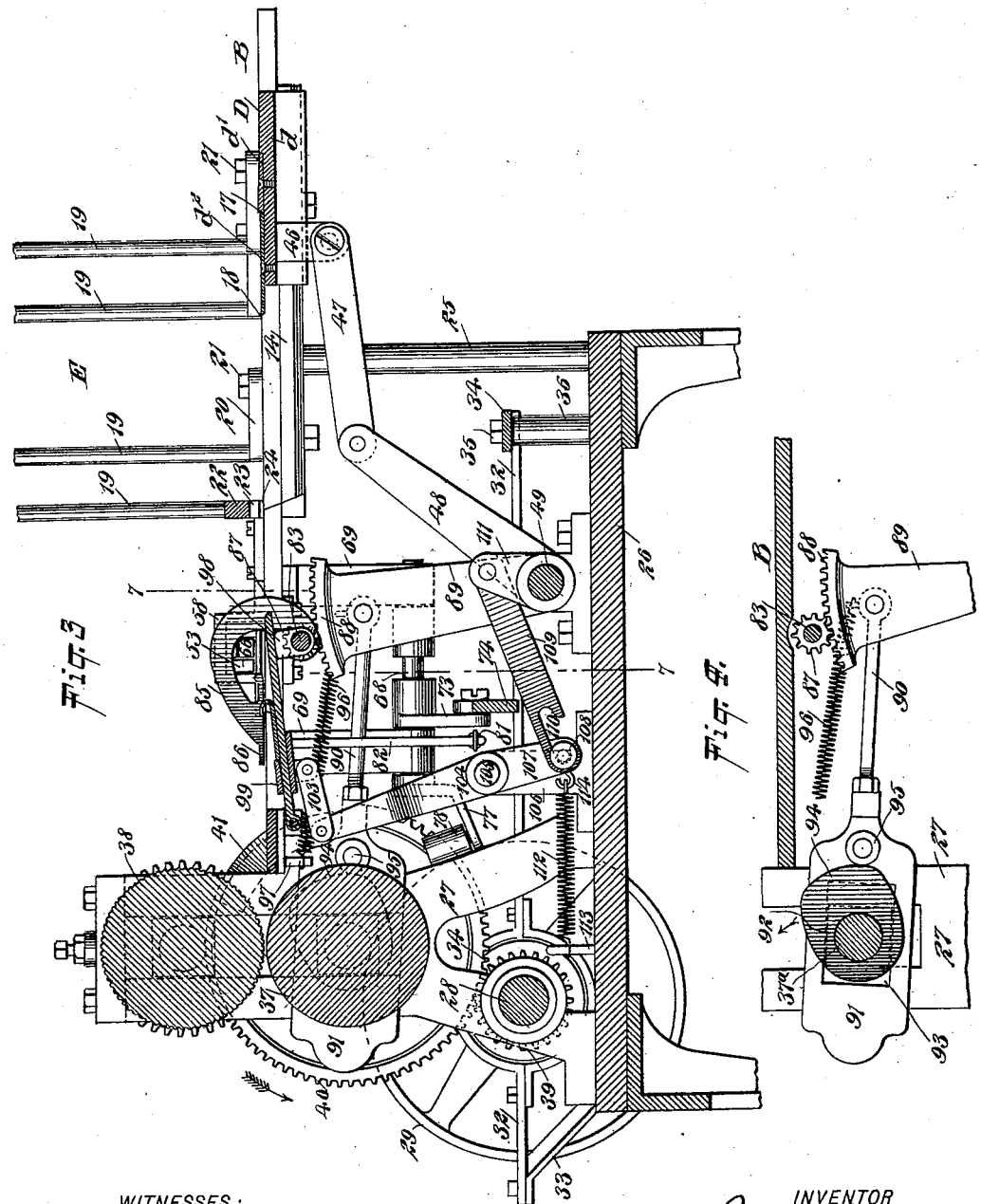

No. 648,241. Patented Apr. 24, 1900.
J. T. CRAW.
PAPER BOX MACHINE.
(Application filed Dec. 16, 1899.)
(No Model.) 7 Sheets—Sheet 4.
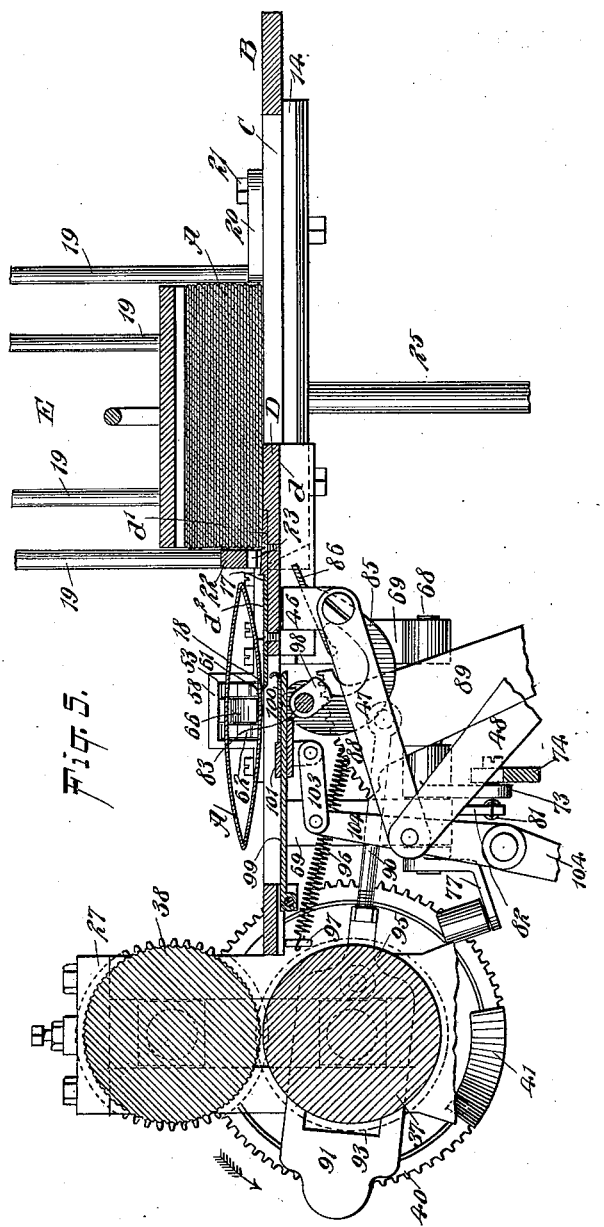
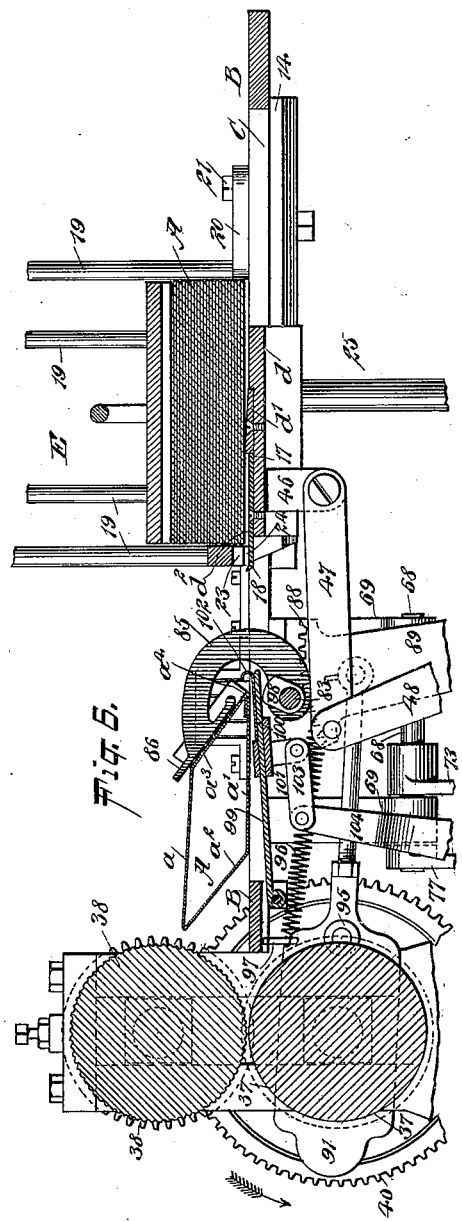
WITNESSES
INVENTOR
Joseph T. Craw
BY
ATTORNEYS No. 648,241. Patented Apr. 24, 1900.
J. T. CRAW.
PAPER BOX MACHINE.
(Application filed Dec. 16, 1899.)
(No Model.) 7 Sheets—Sheet 5.
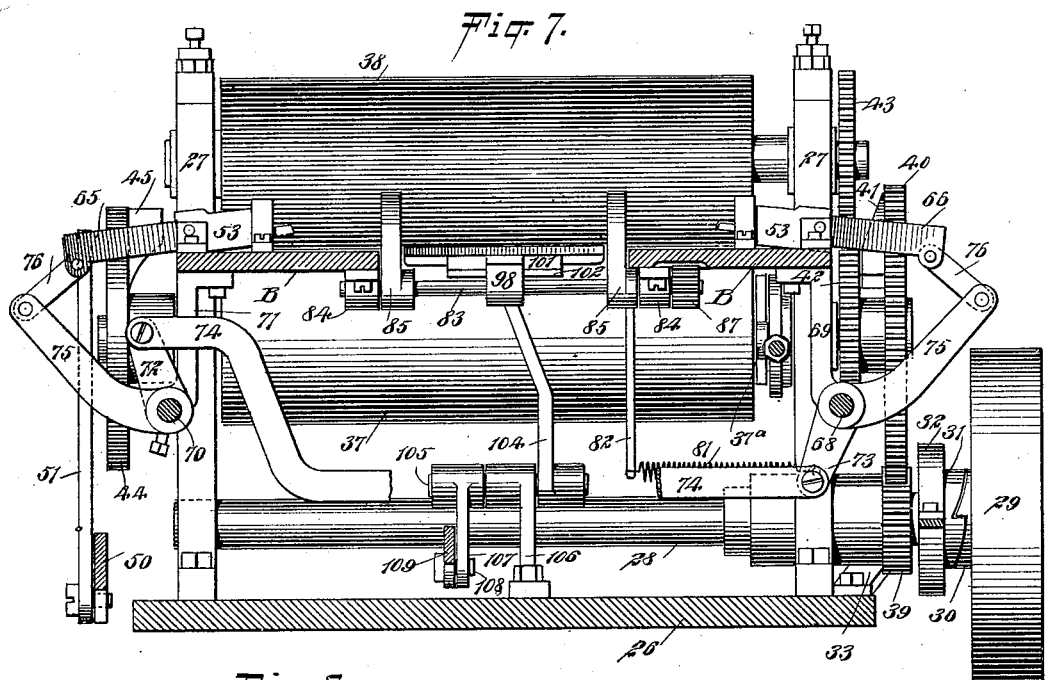
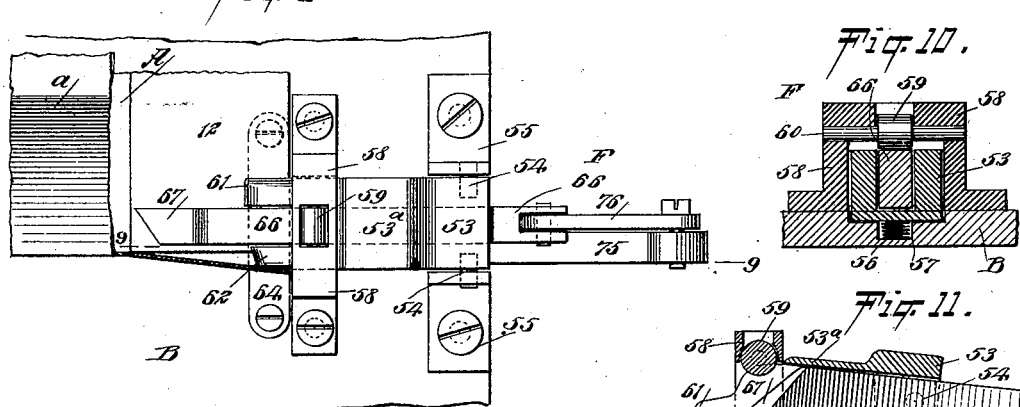
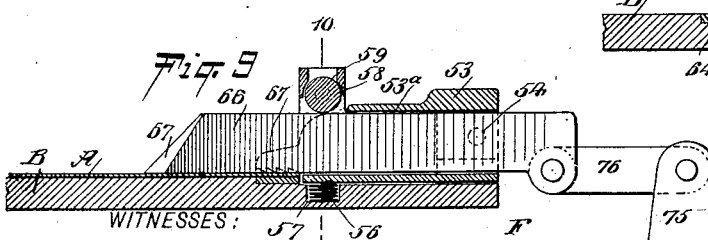
WITNESSES:
INVENTOR
Joseph T. Craw
BY
ATTORNEYS No. 648,241.  
J. T. CRAW.  
PAPER BOX MACHINE.  
(Application filed Dec. 16, 1899.)  
Patented Apr. 24, 1900.  
(No Model.)  
7 Sheets—Sheet 6.
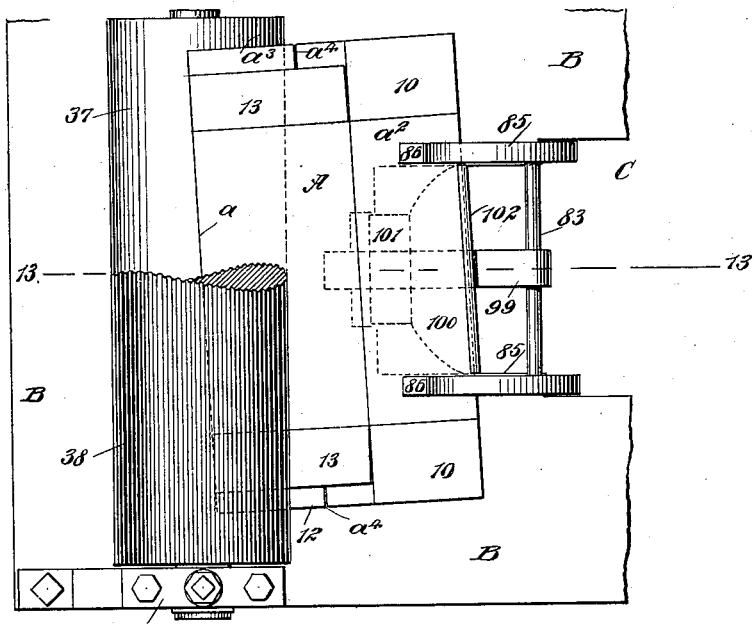
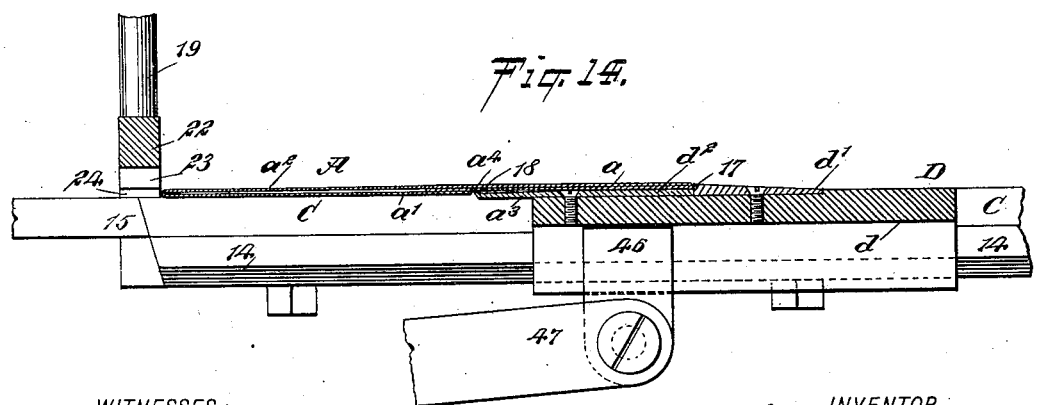
WITNESSES:  
INVENTOR  
Joseph T. Craw  
BY  
ATTORNEYS No. 648,241.
J. T. CRAW.
PAPER BOX MACHINE.
(Application filed Dec. 16, 1899.)
Patented Apr. 24, 1900.
(No Model.)
7 Sheets—Sheet 7.
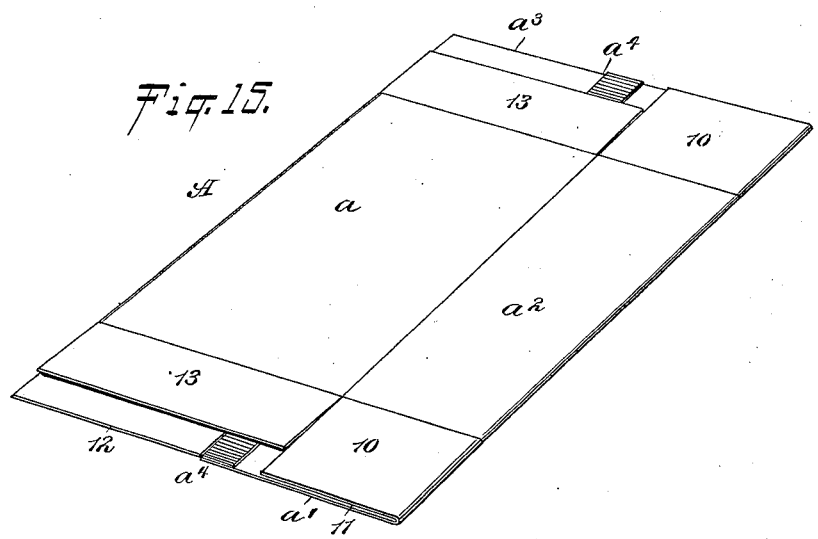
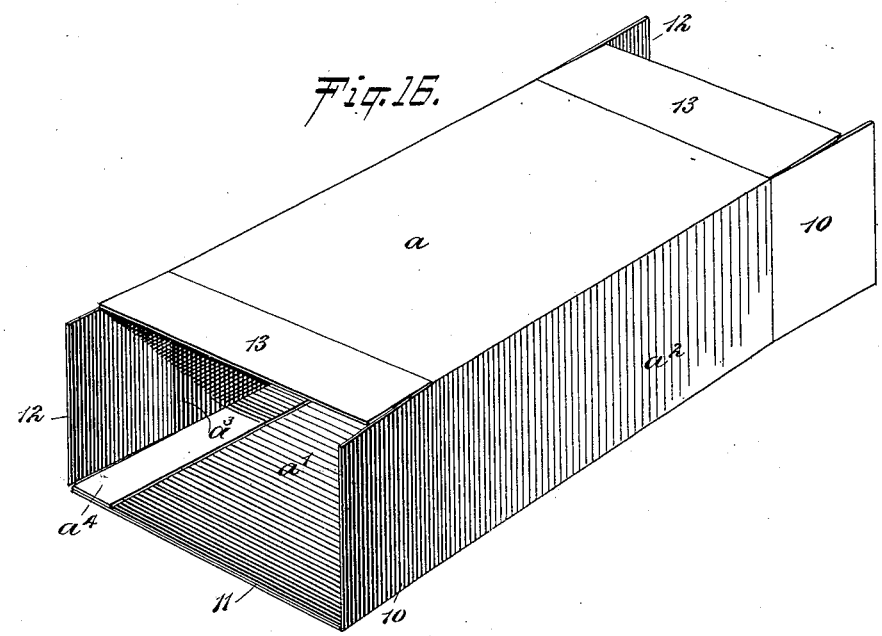

UNITED STATES PATENT OFFICE.

JOSEPH T. CRAW, OF JERSEY CITY, NEW JERSEY, ASSIGNOR OF ONE-HALF TO ROBERT P. BROWN AND EDWARD L. BAILEY, OF PHILADELPHIA, PENNSYLVANIA.

PAPER-BOX MACHINE.

SPECIFICATION forming part of Letters Patent No. 648,241, dated April 24, 1900.

Application filed December 16, 1899. Serial No. 740,558. (No model.)

*To all whom it may concern:*

Be it known that I, JOSEPH T. CRAW, a citizen of the United States, residing at Jersey City, in the county of Hudson and State of New Jersey, have invented a new and Improved Paper-Box-Reversing Machine, of which the following is a full, clear, and exact description.

The object of my invention is to provide a machine which will open the completed blanks or forms of paper boxes even after they have been passed through a printing-press or subjected to very heavy pressure and by automatically reversing the folding of the box blanks or forms deliver them in such condition that they may be duly sealed at their ends and set up to receive material.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the machine. Fig. 2 is a side elevation of the same, the parts being in their normal position. Fig. 3 is a longitudinal vertical section taken on the line 3 3 of Fig. 1. Fig. 4 is a detail sectional view, drawn on a large scale, of the operative mechanism of the reversing-arms. Fig. 5 is a partial longitudinal section of the machine, taken on the same line as Fig. 3, but illustrating the position of the parts when the unfolding or opening devices are in operation and likewise a transverse section through a box which is being opened. Fig. 6 is a section similar to Fig. 5, illustrating, however, the position of the parts of the machine when the box is being reversed and also illustrating a box in transverse section in the act of reversing. Fig. 7 is a transverse section taken practically on the line 7 7 of Fig. 3. Fig. 8 is a plan view of an opening-blade in opening position and a portion of a box blank or form which is being operated upon. Fig. 9 is a longitudinal section taken practically on the line 9 9 of Fig. 8. Fig. 10 is a transverse section taken practically on the line 10 10 of Fig. 9. Fig. 11 is a longitudinal section through the guides for an opening-blade, showing the blade in side elevation. Fig. 12 is a plan view of a portion of the front of the machine, parts being broken away, illustrating the manner in which the reversed box blanks or forms are fed to the delivery mechanism. Fig. 13 is a section taken practically on the line 13 13 of Fig. 12. Fig. 14 is an enlarged vertical section through the rear portion of the bed of the machine and through the feed-table. Fig. 15 is a perspective view of a completed box blank or form in condition to be placed in the machine, and Fig. 16 is a perspective view of the box blank or form in the shape that it naturally assumes when taken up by an operator after having been delivered from the machine.

The box blanks or forms that are to be treated by the machine are folded flat, as shown in Fig. 15, and are placed in a suitable reservoir in the machine in their flat condition, from whence they are automatically conducted through the machine and opened up or placed in such condition that as soon as they are taken up they will practically assume a shape which will enable them to pass squarely upon a suitable block to close and seal the bottom of the box and place the box in condition to be filled.

The box blank or form A is preferably of the shape shown in Fig. 15, in which it is represented with a front $a$, a back $a'$, and sides $a^2$ and $a^3$. Usually the box is made from a single piece of material, and the longitudinal edges of the material are usually carried one over the other, forming thereby at the outside of the blank or form an offset or shoulder $a^4$, extending from end to end, as shown in Figs. 15 and 16. The side $a^2$ is provided with flaps 10 at each end. The back $a'$ is provided likewise with flaps 11 of the same length as the flaps 10. The side $a^3$ is provided with flaps 12 of the same length as the other flaps, and the front $a$ is provided with end flaps 13 of less width than the width of the other flaps, as is likewise shown in Fig. 15, whereby when the blank A is folded flat the inner faces of the end flaps 12 of the side $a^3$ are exposed and a portion of the inner faces of the flaps belonging to the back $a'$; but it will be understood that either the front or the back flaps may be the shorter ones, if so desired. When the flaps are formed as above set forth and a blank or form A has been passed through a press to receive suitable printing matter, the exposed faces of the long flaps mating with the shorter ones form surfaces upon which a gripping action may be obtained when the form or blank is being passed through a machine for the purpose of being reversed in position or folding. In the construction of the machine employed for this purpose a table B is employed of suitable length and width and of desired formation; but usually the table B is somewhat rectangular, and the said table is provided with a longitudinal opening C, extending from a point near its rear end to a point near its forward end. At each side wall of the rear portion of the opening C a slideway 14 is constructed, and preferably near the center of the opening C and at the forward ends of the slideways 14 the opening C is widened by forming recesses 15 in its side edges, and a recess 16 is also preferably made in the forward end wall of the said opening C, as shown in Fig. 1. This variation in the width and length of the opening C is to accommodate the various mechanisms that will be hereinafter described.

A carrier D is mounted to slide in the rear portion of the opening C, and this carrier is provided with a transverse shoulder 17 between its ends and with an upturned transverse edge 18 at its forward end. This carrier may be made in one piece, if desired; but, as illustrated, it consists of two upper parts $d'$ and $d^2$, secured in any suitable or approved manner to a bed $d$, which bed is provided with side ribs on its under surface, having grooves receiving the slideways 14, as shown in Fig. 3; but I desire it to be understood that I do not confine myself to this especial construction of carrier, although I consider it necessary that the carrier should be provided with the aforesaid shoulder 17 and the upturned forward edge 18, as the carrier is adapted to feed the blanks or forms forwardly, and to that end the rear longitudinal edge of the blank or form will have bearing against the shoulder 17, while the upturned edge 18 will engage with the shoulder or offset $a^4$ on the under surface of the blank or form, as shown in Figs. 5 and 14. In this manner the carrier when moved forward will positively carry with it the blank or form that is placed upon it. These blanks or forms A are placed one upon the other, forming a column within a cage or receiver E, and said cage or receiver consists of a series of vertical bars or rods 19, each generally provided with a horizontal foot 20, adjustably secured at 21 to the upper face of the bed-plate B, at each side of the opening C therein, together with a cross-bar 22, which extends, preferably, from side to side of the bed-plate across the opening C at the forward termination of the slideways 14, as shown in Fig. 1.

The cross-bar 22 may be provided with uprights or rods, if desired, and in the under surface of said cross-bar 22 a recess 23 is made, which recess is located over the opening C and adjacent portion of the bed-plate or table B, and at each side of the opening C a projection 24 extends downward from the recessed portion of the cross-bar 22, (see Figs. 3 and 14,) which projections are adapted to engage with the upper surface of the forms or blanks placed upon the carrier D as the carrier passes beneath the cross-bar, thus insuring the blanks or forms remaining in position on the carrier at such time.

The bed-plate B is supported at its rear by pillars 25 or the like from a base 26, supported by legs or otherwise sustained, and at its forward portion the bed-plate is connected with uprights 27, which are carried above the bed-plate, as shown in Figs. 2, 3, 5, and 7. A drive-shaft 28 is journaled in suitable bearings usually located in the said uprights 27, and a pulley 29 is loosely mounted on the shaft 28, the pulley being provided with a clutch-face 30, adapted to be engaged by a clutch 31, mounted to slide on the drive-shaft and turn therewith. The clutch 31 is shifted to and from the pulley 29 by means of a shifting arm 32, shown pivoted at its forward end on a bracket 33, which projects from a forward corner of the bed-plate B, as shown in Fig. 1. The shifting arm or bar 32 extends rearwardly a suitable distance and is pivotally attached to a lever 34, which is carried beneath the bed-plate to the opposite side of the machine, terminating in a handle 35, and the said lever 34 is provided with a slot through which a pin or bolt $35^a$ is passed into a stud 36, located on the base 26, as shown in Fig. 3. Thus by drawing or pushing the lever 34 to or from the operator the clutch 31 is carried into or out of engagement with the pulley 29, which is belted to a suitable source of power, and consequently the drive-shaft is given motion or remains idle, as desired. The spindles of a roller 37 are journaled in suitable bearings located in the standards 27 at the front of the machine, and a second roller 38 is located above the lower roller 37 and is arranged to act in conjunction therewith. The upper roller is adjusted to or from the lower roller in any suitable or approved manner. The lower roller is usually smooth, while the upper roller 38 is preferably roughened, and these rollers are adapted to receive the box blanks or forms after they have been reversed and conduct the same out at the front of the machine.

A pinion 39 is secured upon the drive-shaft 28 adjacent to the clutch 31, and this pinion meshes with a large gear 40, which is secured upon the left-hand spindle of the lower roller 37, as shown in Fig. 1. The said gear 40 is provided with a cam 41 upon its inner face, which cam is inclined in opposite directions from its center. A driving-gear 42 is likewise secured upon the left-hand spindle of the lower roller 37, meshing with a similar gear 43, secured upon the corresponding spindle of the upper roller 38, and in this manner motion is conveyed from one roller to the other. A disk 44 is secured upon the right-hand end of the spindle of the lower roller 37, and the disk 44 is provided with a cam 45 upon its inner face of the same nature as the cam 41 on the gear 40 at the left-hand side of the machine. The cams 41 and 45 bear such relation to each other that when the cam 41 is uppermost or at the upper portion of its carrying wheel or gear 40 the cam 45 will be a quarter of a circle either to the right or to the left of the said cam 41. These cams 41 and 45 are adapted to operate clamping and opening devices F, to be hereinafter described.

The carrier D is operated in the following manner: A stud 46 is projected downward from its central forward portion, and the stud is pivotally connected with a link 47, which link in its turn is pivoted to a crank-arm 48, attached to a shaft 49, journaled in suitable bearings upon the base 26 of the machine, and at the right-hand end of the shaft 49 a crank-arm 50 is secured, which is pivoted to a connecting-rod or pitman 51, and the said connecting-rod or pitman is pivotally attached to the disk 44 through the medium of a suitable wrist-pin 52, as shown in Figs. 1 and 2.

The devices F above mentioned, adapted for clamping and opening a blank or form prior to its being reversed by mechanism to be hereinafter set forth, are shown particularly in Figs. 1, 8, 9, 10, and 11. Each device F consists of a guide-box 53, and said guide-boxes are located immediately opposite each other at the sides of the machine and upon the bed-plate B. The inner ends of these boxes are nearly opposite the forward ends of the recesses 15 in the main opening C in the bed-plate B, as illustrated in Fig. 1, and each box is reduced in thickness at its forward end, as shown at 53ᵃ in Figs. 8, 9, and 11 in the drawings. The inner end of each guide-box is open at the top to a greater or a less extent, and each guide-box is provided with trunnions 54, whereby the boxes are adapted to rock in supports 55, as shown best in Fig. 1 and also in Fig. 8. The boxes are normally held upwardly inclined at their inner ends through the medium of springs 56 engaging with the bottom of the boxes, as shown particularly in Fig. 11, which springs rest in suitable sockets 57 made in the bed-plate B. The inner or open ends of the guide-boxes 53 have vertical play in guide-straps 58, secured to the bed-plate B, as shown in Figs. 1, 8, 9, 10, and 11. Each guide-strap 58 is provided with a friction-roller 59, usually mounted to turn on a spindle 60, as shown in Fig. 10; but the friction-rollers 59 may be otherwise supported, if desired.

At the forward end of the left-hand guide-box 53 two inwardly-extending clamping-arms 61 and 62 are provided, while a single clamping-arm 61ᵃ only is provided for the right-hand guide-box 53. The reason that two clamping-arms are formed on the left-hand guide-box is that the opener, to be hereinafter described and having play in this box, is designed not only to open the blank or form A, but also to disconnect the top and bottom portions should they become glued together, which often happens, as the operator in pasting a form or blank handles it at the end which is presented to the left-hand box, whereas the right-hand box is required only to hold the lower member of the form or blank firmly on the bed-plate B while the openers are operating and while the reversing mechanism, to be hereinafter set forth, is brought into action. The clamping-arms of the boxes 53 are preferably serrated upon their under faces and extend over serrations 63, made either directly in the bed-plate B or in inserted plates 64, as shown in Fig. 1.

Each of the boxes 53 is provided with an opener, the right-hand opener being designated as 65 and the left-hand opener as 66. Both of these openers are clearly shown in Fig. 1. Each opener is provided at its inner end with an inclined or beveled surface 67; but the left-hand opener 66, in addition to the bevel at its inner end, is provided likewise with a sharpened or knife edge at its inner end, whereby when the opener is introduced between the upper and lower members of a form or blank, as heretofore stated, it will cut through any paste that may have been placed in the form or blank and acts to tie the two faces together. At the left-hand side of the machine hangers 69 are secured to the under surface of the bed-plate B, and in these hangers a short shaft 68 is mounted, while a corresponding shaft 70 is at the right-hand side of the machine, being mounted to turn in hangers 71, as shown in Fig. 7. The right-hand shaft 70 is provided with an upwardly-extending crank-arm 72, and the left-hand shaft 68 is provided with a corresponding downwardly-extending crank-arm 73, as shown also in Fig. 7, and the free ends of the two crank-arms 72 and 73 are united by a connecting-bar 74, so that when one shaft is operated the other shaft will likewise receive motion. Each shaft 68 and 70 is also provided with an upwardly and outwardly extending crank-arm 75, longer than the crank-arms 72 and 73, and the longer and outwardly-extending crank-arms 75 are connected by links 76 with the outer ends of the openers 65 and 66, as illustrated in Fig. 7.

A downwardly-extending crank-arm 77 (shown in Figs. 1 and 3) is located at the forward end of the left-hand-side shaft 68, the crank-arm having an upwardly-extending friction-roller 78, adapted for engagement by the cam 41 at the upper left-hand side of the machine. At the forward end of the right-hand-side shaft 70 an upwardly-extending crank-arm 79 is provided, having a friction-roller 80, adapted to be engaged by the cam 45 on the disk 44 at the right-hand side of the machine. When the crank-arm 79 is in engagement with the cam 45, the connecting-bar 74 is moved from right to left, and the upwardly-extending arms 75, carried by the side shafts, are rocked inwardly, causing the guide-boxes 53 to be brought to a horizontal position and their jaws brought in clamping engagement with the bed-plate, while at the same time the openers 65 and 66 are forced inward and out through the inner ends of the guide-boxes. As soon as the cam 45 releases the crank-arm 79 the cam 41 engages with the crank-arm 77 and forces the connecting-bar 74 from left to right, restoring the openers 65 and 66 and the boxes 53 to their normal position. The return movement of the connecting-bar 74 is assisted by attaching a spring 81 at one of its ends to the crank-arm 73, to which the left-hand end of the connecting-bar 74 is attached, the other end of the spring being secured to a support 82, attached, preferably, to the under face of the bed-plate B, as illustrated in Fig. 7.

A shaft 83 is journaled in bearings 84, secured to the under surface of the bed-plate B, one bearing at each side of the opening C in said bed-plate, and the shaft is so placed that it is adjacent to the forward end of the side recesses 15 in the bed-plate B, as shown in Fig. 1 The shaft 83 is provided with two reversing-arms 85, and, as shown in Figs. 3, 6, and 13, these arms are substantially C-shaped and when in operation curve forwardly over the bed-plate. The free end of each of the reversing-arms is provided with a flat head 86. These reversing-arms are secured to the shaft and when in working position are adapted to extend up through the recesses 15 in the sides of the main opening C of the bed-plate. A pinion 87 is secured, preferably, to one end of the shaft 83, and this pinion 87, as shown in Fig. 4, is in engagement with a toothed segment 88, located on a bar-support 89, which bar-support is loosely mounted on the rock-shaft 49. A pitman 90 is pivotally attached to the bar-support 89 of the said toothed segment at or near the upper end of the said support, and the pitman 90 is provided with an elongated head 91, having a slot 93 made therein, which loosely receives a guide-block 92, the said block being loosely mounted on the left-hand spindle 37ª of the lower delivery-roller 37. A cam 94 is secured to the said spindle 37ª, and the said cam is adapted for peripheral engagement with a friction-roller 95, carried by the head 91 of the pitman. A spring 96 is secured at one of its ends to the support 89 for the toothed segment 88. The opposite end of the spring, as shown in Fig. 3, is secured to a support 97 below the bed-plate and located at the forward portion of the same. When the toe of the cam 94 engages with the friction-roller 95, the toothed segment 88 is rocked rearwardly and will so turn the shaft 83, through the medium of the pinion 87, that the reversing-arms will be carried upward in such manner that their heads 86 will be immediately over and parallel with the upper surface of the bed-plate B. As the smaller section of the cam is presented to the friction-roller 95 the spring 96 will return the segment 88 to its normal position and will bring the reversing-arms 85 to their normal position below the bed-plate, as is illustrated in Fig. 5.

An arm 98 is secured upon the shaft 83. This arm extends in direction of the curvature of the reversing-arms and is located about centrally between them, the said arm 98 being a trip-arm, and when the reversing-arms are in their working position, as shown in Figs. 3 and 13, the trip-arm 98 occupies an upwardly-extending or vertical position. This trip-arm 98 is adapted to engage with the rear or free end of a tongue 99, which tongue, as shown in Figs. 3, 5, and 6, is pivoted beneath the bed-plate, just forward of the forward end of the main slot C in said bed-plate. A delivery-table 100 is adapted to have sliding movement on the tongue, which is accomplished by attaching a suitable block 101 to the forward end of the table, the said block having a slot through which the tongue 99 is passed, as shown in Figs. 3, 5, 6, and 13. The rear edge of the table 100 is inclined or diagonal, the table at the left-hand end being of less width than at the right-hand end, and the rear edge of the table is provided with an upwardly and forwardly turned flange 102. (See Figs. 1, 3, 5, 6, and 13.) Normally the delivery-table and the tongue 99 are below the plane of the upper surface of the bed-plate, as shown in Fig. 5, and remain so until a reversed form or blank is to be conducted to the delivery-rollers 37 and 38, and the said delivery-table is carried upward only when the reversing-arms 85 are brought to their upper or outer position. These reversing-arms 85 are adapted to reverse the folding of the form or blank that has been opened by the openers 65 and 66, and when the form or blank has been thus reversed its rear edge is received by the flange 102 on the delivery-table 100, and as this table moves forward in a manner which will be described the upturned flange 102 of the table will give the form or blank such an inclination that it will be passed diagonally to the delivery-rollers 37 and 38, and one end of the blank will be sure to enter the space between the rollers in advance of the body. Thus each form or blank will be positively received between the delivery-rollers, and when a blank or form leaves the said rollers, the folds having been pressed in both directions, the form or blank will spring open, as shown in Fig. 16, enabling the box to be squarely finished, with its scores broken down ready for the bottom to be closed and sealed and the box placed in condition to be filled.

The movement of the delivery-table is brought about by attaching a link 103 to a projection from the guide-block 101 from the table, as shown in Figs. 3, 5, 6, and 13, and pivotally connecting the link 103 with one end of a lever 104, attached to a short shaft 105, journaled in bearings 106, secured to the base 26. A crank-arm 107 extends downward from the short shaft 105 and terminates in a pin 108. A link 109 has an elongated slot 110 in its forward end, which slot receives the pin 108, and the opposite end of the said link 109 is pivotally attached to a crank-arm 111, extending upwardly from the rock-shaft 49. The elongated slot is provided in order that the delivery-table may have the period of rest above alluded to, and when the table has been carried to its forward position by the action of the crank-arm 111 and link 109 when the link 109 moves forwardly the table is carried to its rear or normal position on the tongue by a spring 112, attached by a hook 114 or its equivalent to the crank-arm 107 and likewise to a support 113, which is secured to the bed. In order that the blanks or forms when placed in the cage E shall slide readily when the carrier D is operated, longitudinal depressions 115 are usually made in the upper face of the bed-plate to receive the flaps of the forms or blanks.

In the operation of the machine when the parts are in their normal position (shown in Fig. 1) and the driving-shaft 28 is revolved the rock-shaft 49 is set in motion and the carrier, with the form or blank thereon, as shown in Fig. 14, will move forward until its forward edge reaches a point at or near the forward end of the recess 15 in the main opening C of the bed-plate B. Just at this time the right-hand cam 45 engages with the right-hand crank-arm 72, thus forcing the connecting-bar 74 to the right with reference to Fig. 7, and placing the spring 81 under tension. This movement of the connecting-bar 74 causes both side shafts 68 and 70 to carry their upwardly-extending crank-arms 75 inward, thus forcing the openers 65 and 66 upward, causing the guide-boxes 53 to be rocked downward and their clamping-jaws 61 and 62 to firmly engage with the upper portion of the lower member of the blank or form A on the carrier, pressing the blank or form firmly upon the bed-plate. The carrier now commences to move back to receive another blank or form, and as the guide-boxes cannot be moved farther downward and the action of the cam 45 still continues to operate the side shafts 68 and 70 the crank-arms 75, through their links 76, force the openers 65 and 66 in direction of each other and between the top and bottom of the clamped form or blank, separating said parts, as shown in Fig. 5. The cam 45 now disengages from the crank 72, and the cam 41 at the opposite side of the machine is brought into action, engaging with the reversely-mounted crank-arm 77 at the left of the machine, whereupon this cam 41, assisted by the spring 81, carries the connecting-bar 74 to the left with reference to Fig. 7, thus drawing outward the openers 65 and 66 and restoring the guide-boxes 53 to their upwardly-inclined or normal position. While the blanks are still attached to the table the toe of the cam 94 acts upon the friction-roller 95 on the pitman-head 91, thus forcing the pitman 90 rearward and causing the shaft 83 to revolve in such manner that the reversing-arms will be carried upward and will engage the form or blank at its rear edge and reverse the folding thereof, as shown in Fig. 6, the form or blank being meanwhile held in place by the jaws of the guide-boxes 53. When the heads 86 of the reversing-arms 85 have reached a position just above and parallel with the upper face of the bed-plate, they will have pressed the blank or mold flat and the crank arm or projection 98 on the reversing-shaft 83 will have been carried upward a sufficient distance to raise the rear end of the delivery-table 100 in a manner to bring the flange 102 of said table above the upper surface of the bed-plate. At this time the cam 94 will have presented its reduced portion to the friction-roller 95 of the pitman, and the reversing-shaft will be turned through its connection with the rack in a manner to carry the reversing-arms downward again beneath the bed-plate B, as shown in Fig. 5, and the link 109, connected with the operating device for the delivery-table, will now be drawn rearward through the action of the crank-arm 111 on the rock-shaft 49, causing the delivery-table, with its reversely folded and treated blank or form, to move in direction of the delivery-rollers 37 and 38, meanwhile giving a diagonal position to the said form, so that a corner of the form or blank will first enter the space between the delivery-rolls, as has been stated. As soon as the delivery-table has moved a sufficient distance to cause the blank or form to be engaged by the delivery-rollers the link 109 will be at its forward movement, and the spring 112 will return the table to its forward or receiving position. At about this time the reversing-arms will have assumed their normal position beneath the bed-plate B, and consequently the crank-arm 98 on the reversing-shaft will have been carried downward, and the delivery-table and its support will then fall to their normal position below the plane of the upper surface of the bed-plate, as shown in Fig. 5. At this time also the carrier will have brought another blank to be clamped and opened by the combined clamping and opening devices F, as has been described.

Having thus described my invention, I claim as new and desire to secure by Letters Patent—

1. In a machine for treating paper boxes, a carrier for folded blanks or forms, having a point of contact for an edge of the form, and a second point of contact arranged for engagement with a seam in the form or blank.

2. In a machine for treating paper boxes, a traveling carrier provided with a shoulder and at its forward end with a parallel upturned edge forming a biting-surface, for the purpose specified.

3. In a machine for treating paper boxes, a support, a traveling carrier for the forms or blanks of the boxes, gripping devices adapted to hold the forms or blanks temporarily upon the said support, an opening device adapted to pass between the members of the form or blank and mechanism for timing the movements of the carrier-gripping devices and opening device.

4. In a machine for treating folded blanks for paper boxes, a support, a carrier mounted to slide upon the support, provided with a bearing and a biting surface, clamping devices adapted to hold the blanks on the said support, means adapted to pass between the members of the clamped blank for unfolding the same, and mechanism, substantially as described, for controlling and timing the movements of the carrier, the clamping devices and openers.

5. In a machine for the treatment of folded blanks for paper boxes, a bed-plate, an adjustable cage carried by the bed-plate, a carrier having sliding movement in the bed-plate at the bottom of the cage, the carrier being provided with means for temporarily biting a blank received thereby, clamping devices located at each side of the path of travel of the blank to be treated, opening devices operating in conjunction with clamping devices and adapted to pass between the members of the blank, and mechanism, substantially as described, whereby the movements of the carrier, the clamping and opening devices are timed, as set forth.

6. In a machine for the treatment of folded blanks for paper boxes and the like, a bed, a carrier arranged to temporarily hold a blank in the bed, clamping and having movement in the bed, clamping devices mounted upon the bed, opening devices operating in conjunction with the clamping devices and adapted to pass between the members of the clamped blank, a reversing mechanism arranged for operation in connection with the clamping and opening devices for reversing the folding of the opened blank, and means for operating the said parts, as set forth.

7. In a machine for the treatment of folded blanks for paper boxes and the like, a bed-plate having an opening therein, a carrier adapted to slide over a portion of the opening, clamping and opening devices arranged at each side of the said opening, reversing devices located between the clamping devices, and means for carrying the said reversing devices to points above and below the bed, as and for the purpose set forth.

8. In a machine for the treatment of folded blanks for paper boxes and the like, a bed-plate having an opening therein, a carrier adapted to slide over a portion of the opening, clamping and opening devices arranged at each side of the said opening, reversing devices located between the clamping devices, means for carrying the said reversing devices to points above and below the bed, a delivery-table located adjacent to the reversing devices, and delivery-rollers located adjacent to the delivery-table, for the purpose specified.

9. In a machine for the treatment of folded blanks for paper boxes, consisting of a bed-plate having an opening therein, a carrier having a biting-surface and mounted to travel over a portion of the said opening, coöperating clamping and opening devices at each side of the said opening at a point in advance of the forward travel of the carrier, rotating reversing-arms mounted to extend either above or below the bed, and a delivery mechanism arranged to receive a blank after it has been acted upon by the reversing-arms, as described.

10. A machine for the treatment of folded blanks for paper boxes, consisting of a bed-plate having an opening therein, a carrier having a biting-surface and mounted to travel over a portion of the said opening, coöperating clamping and opening devices at each side of the said opening at a point in advance of the forward travel of the carrier, rotating reversing-arms mounted to extend either above or below the bed, a delivery mechanism arranged to receive a form or blank after it has been acted upon by the reversing-arms, a delivery-table mounted to slide between the reversing-arms in a portion of the said opening, and means for raising and lowering the delivery-table, as set forth.

11. In a machine for the treatment of blanks for paper boxes, a delivery-table and a discharging mechanism, the delivery-table having movement to and from the discharging mechanism, and being provided with a diagonal surface adapted to receive a blank, as described.

12. In a machine for the treatment of folded blanks for paper boxes and the like, a bed-plate, a delivery-table having vertical and sliding movement, one edge of the said table being transversely inclined, and a flange at the inclined edge, as described.

13. In a machine for the treatment of folded blanks for paper boxes and the like, a support, a reversing mechanism, means for delivering blanks to the reversing mechanism and temporarily securing said blanks to said support, and a table having movement to and from the reversing mechanism, and controlled by the latter, as set forth.

14. In a machine for the treatment of folded blanks for paper boxes and the like, the combination, with a bed-plate having an opening therein, a carrier mounted to slide in the said opening, guides having a clamp-surface and pivotally mounted on the bed at each side of the said opening, openers having sliding movement in the said guides, the said openers being provided with inclined inner ends, and means for simultaneously operating the openers and the guides, of reversing-arms located between the guides and arranged to extend either above or below the bed, means for operating the said reversing-arms, a releasing mechanism for the guides, a delivery-table arranged adjacent to the reversing-arms, and a discharging mechanism adapted to receive material from the said table.

15. In a machine for the treatment of folded blanks for paper boxes, the combination, with a bed having an opening therein, clamping devices located at each side of the opening, openers mounted to slide in the clamping devices, and a driving mechanism, substantially as described, for simultaneously bringing the openers and the clamping devices into operation and for simultaneously releasing the same, of a shaft mounted on the bed at the said opening, means for rocking the said shaft, curved reversing-arms attached to the said shaft, adapted in working position to extend over the bed-plate, a delivery-table arranged to receive the material treated by the said reversing-arms, and rollers arranged to receive between them the material from the table.

16. In a machine for the treatment of folded blanks for paper boxes and the like, the combination, with a bed having an opening therein, clamping devices located at each side of the opening, openers mounted to slide in the clamping devices, and a driving mechanism, substantially as described, for simultaneously bringing the openers and the clamping devices into operation and for simultaneously releasing the same, of a shaft mounted on the bed at the said opening, means for rocking the said shaft, curved reversing-arms attached to the said shaft, adapted in working position to extend over the bed-plate, a delivery-table arranged to receive the material treated by the said reversing-arms, rollers arranged to receive between them the material from the table, the said table being provided with an inclined flanged receiving edge, a support upon which the said table has sliding movement, and means for raising and lowering the support by the movement of the shaft carrying the reversing-arms, as set forth.

17. In a machine for the treatment of folded blanks for paper boxes and the like, a bed, a carrier mounted to slide upon the bed, clamping devices arranged to receive material from the carrier and temporarily hold said material to the bed, opening devices operating in conjunction with the clamping devices, a reversing mechanism located between the clamping devices, a delivery-table having movement to and from the reversing mechanism, and mechanism, substantially as described, for timing the operation of the said parts.

18. In a machine for the treatment of folded box-blanks and the like, the combination, with a bed, an adjustable cage supported by the bed, and a carrier having a gripping-surface adapted to slide on the bed at the bottom of the cage, of coöperating clamping and opening devices located at each side of the path of travel of the carrier, reversing-arms, a rocking support for the reversing-arms, the reversing-arms being located between the clamping devices, rollers adapted to receive the reversed material, and a conductor for the said material, having movement between the rollers and the reversing-arms, substantially as described.

19. In a machine for the treatment of folded blanks for paper boxes and the like, a bed-plate, guides pivoted on the bed-plate and provided with clamping-jaws, bars having sliding movement in the said guides, said bars serving as openers and having their inner ends inclined, a drive-shaft, driven shafts, a crank and connecting-rod connection between the driven shafts, and a crank-and-link connection between the driven shafts and the said bars, as set forth.

20. In a machine for the treatment of blanks for paper boxes and the like, a carrier for the blanks, clamping devices arranged at opposite sides of the path of travel of the blank, and adapted to engage the ends of the said blank and a reversing mechanism in coöperative association with the said carrier for reversely folding the blank.

21. In a machine for the treatment of blanks for paper boxes and the like, a carrier for the blanks, clamping devices arranged to secure a blank conveyed by the carrier, a device adapted to pass between the members of the blank for opening the same, and a reversing mechanism for the blank for reversely folding the blank, the said clamping and opening devices and reversing mechanism being in coöperative association with the carrier.

22. In a machine for the treatment of blanks for paper boxes and the like, a carrier for the said blanks, having surfaces arranged to engage with an edge of a blank and the overlap of the same, and clamping, opening and reversing mechanism coöperating with the carrier.

23. In a machine for the treatment of blanks for paper boxes and the like, a carrier for the said blanks, having surfaces arranged to engage with an edge of a blank and the overlap of the same, clamping, opening and reversing mechanism coöperating with the carrier, a drive-shaft, and timed driving connection between the drive-shaft and said carrying, clamping, opening and reversing parts, as described.

24. In a machine for the treatment of blanks for paper boxes and the like, a carrier for the blank, having surfaces arranged to engage with an edge of a blank and the overlap of the same, and clamping, opening and reversing mechanism coöperating with the carrier, delivery-rollers adapted to receive the reversed blank, and a delivery-table having sliding movement between the reversing mechanism and the delivery-rollers.

25. In a machine for the treatment of blanks for paper boxes and the like, a carrier for the blanks, having surfaces arranged for engagement with an edge of a blank and the overlap of the same, and clamping, opening and reversing mechanism coöperating with the carrier, delivery-rollers adapted to receive the reversed blank, and a delivery-table mounted to slide between the delivery-rollers and the reversing mechanism, the said table being provided with a diagonally-upturned edge, adapted for engagement with an edge of the reversed blank, whereby a corner of the reversed blank is first presented to the biting-surfaces of the delivery-rollers.

26. In a machine for the treatment of blanks for paper boxes and the like, a reciprocating carrier for the blanks, clamping, opening and reversing mechanisms coöperating with the carrier, a delivery-table coöperating with the clamping, opening and reversing mechanisms, adapted to receive a treated blank, a drive-shaft, and a connection between the shaft and the aforesaid parts, whereby the carrier is moved to and from the clamping and opening mechanisms and recedes when said mechanisms are in the operation of clamping and opening, and whereby also the reversing mechanism acts while the clamping mechanism continues in operation, and the delivery-table is in delivery operation when the reversing mechanism has acted and the clamping mechanism has released a blank.

27. In a machine for the treatment of blanks for paper boxes, the combination with a bed or table, of pivoted clamps at opposite sides of the bed or table, reciprocating openers carried by the clamps, and means for operating the clamps and openers, substantially as described.

28. In a machine for the treatment of blanks for paper boxes, the combination with a bed or table, of pivoted and spring-pressed box-like clamps at opposite sides of the bed or table, and openers sliding in the said clamps, and means for operating the clamps and openers, substantially as described.

29. In a machine for the treatment of blanks for paper boxes, the combination with a slotted bed or table, of curved reversing-arms pivoted below the bed or table and provided with heads on their ends, and means for swinging the arms through the slot of the table with their heads approximately parallel with the upper surface of the bed or table, substantially as and for the purpose set forth.

30. In a machine for the treatment of blanks for paper boxes, the combination with a slotted bed or table, of a support pivoted below the slot of the table, a delivery-table slidably mounted on the support, and means for swinging the support up into the slot of the bed or table, substantially as described.

31. In a machine for the treatment of blanks for paper boxes, the combination with a slotted bed or table, of a pivoted support below the slot of the bed or table, a delivery-table slidably mounted on the support, means for swinging the support up into the slot of the table, and means for imparting sliding movement to the said table, substantially as described.

32. In a machine for the treatment of blanks for paper boxes, the combination with a slotted bed or table, of a pivoted support, and a sliding delivery-table carried by the support, curved reversing-arms pivoted below the bed or table, and means for successively swinging the reversing-arms and the table-support, substantially as described.

33. In a machine for the treatment of blanks for paper boxes, the combination with a slotted bed or table, of a delivery-table mounted to swing and slide and provided with a flanged rear end, of pivoted reversing-arms, and means for successively operating the reversing-arms, and swinging and sliding the delivery-table, substantially as described.

34. In a machine for the treatment of blanks for paper boxes, the combination with a slotted bed or table, of a support pivoted below the bed or table, means for swinging the support up into the slot of the bed or table, a delivery-table slidably mounted on the support, means for imparting sliding movement to the delivery-table, curved reversing-arms pivoted below the bed or table and provided with heads at their ends, and means for swinging the reversing-arms up through the slot of the bed or table with their heads parallel with the upper surface of the same, substantially as described.

35. In a machine for the treatment of blanks for paper boxes, the combination with a feed device for feeding the blanks, and means for opening the blanks, of pivoted reversing-arms, for reversely folding the blank, means for operating the reversing-arms, a delivery-table mounted to tilt and slide, and means for successively tilting and sliding the delivery-table, substantially as described.

36. In a machine for the treatment of blanks for paper boxes, the combination with a feed device, for feeding the blanks, and means for opening the blanks, of pivoted reversing-arms for reversely folding the blanks, means for operating the reversing-arms, a delivery-table mounted to tilt and slide, and provided with an inclined and flanged rear end, means for successively tilting and sliding the delivery-table, and delivery-rollers to which the folded blanks are delivered from the table, substantially as described.

In testimony whereof I have signed my name to this specification in the presence of two subscribing witnesses.

JOSEPH T. CRAW.

Witnesses:
J. FRED. ACKER,
JNO. M. RITTER.